United States Patent [19]
Gibson

[11] Patent Number: 5,722,483
[45] Date of Patent: Mar. 3, 1998

[54] AIR EXCHANGE APPARATUS AND METHOD

[76] Inventor: Gary L. Gibson, 95 N. Camino Espanol, Tucson, Ariz. 85716

[21] Appl. No.: 698,205

[22] Filed: Aug. 14, 1996

[51] Int. Cl.$^6$ .................................................. F24F 3/147
[52] U.S. Cl. .............. 165/54; 454/241; 454/250; 454/251
[58] Field of Search .............. 165/54; 454/237, 454/241, 242, 249, 250, 251

[56] References Cited

U.S. PATENT DOCUMENTS

| | | |
|---|---|---|
| 61,820 | 2/1867 | Estes .................................... 454/250 |
| 86,663 | 2/1869 | Grimes . |
| 877,420 | 1/1908 | Hackney ............................ 454/200 X |
| 1,349,482 | 8/1920 | Wood .................................... 165/54 |
| 2,488,333 | 11/1949 | Schlachter . |
| 3,271,710 | 9/1966 | Leonard ............................ 454/237 X |
| 3,726,202 | 4/1973 | Ahlberg . |
| 4,184,538 | 1/1980 | Rauenhorst . |
| 4,348,818 | 9/1982 | Brown . |
| 4,590,990 | 5/1986 | George . |
| 4,616,696 | 10/1986 | Brundrett et al. . |
| 4,718,130 | 1/1988 | Steinbeck . |
| 4,794,980 | 1/1989 | Raisanen ............................ 165/54 |
| 4,993,484 | 2/1991 | Neuzil ............................ 165/54 |
| 5,000,081 | 3/1991 | Gilmer . |
| 5,435,377 | 7/1995 | Kratochvil . |

FOREIGN PATENT DOCUMENTS

| | | | |
|---|---|---|---|
| 33 27 685 | 2/1985 | Germany ................ 165/54 |
| 35 21 494 | 12/1986 | Germany ................ 165/54 |
| 57-166434 | 10/1982 | Japan ................ 454/250 |
| 86/06461 | 11/1986 | WIPO ................ 165/54 |

*Primary Examiner*—Harold Joyce
*Attorney, Agent, or Firm*—Jones & Askew, LLP

[57] ABSTRACT

Apparatus and method for removing stale air from a residence or other enclosed space, and replacing that air with fresh air from outside the enclosed space. Stale air outlets are placed at the ceiling in one or more locations throughout the enclosed space and ducts connect those outlets to an air vent elevated in relation to the stale air outlets. An inlet air passage extends between a fresh air inlet located outside the enclosed space, and the air return side of a forced-air heating/cooling unit in the enclosed space. Warm air rises to the ceiling within the enclosed space, increasing in pressure and flowing through the stale air outlets to the relatively lower-pressure outside air. This air flow induces an inward flow of fresh air into the system. The outgoing and incoming air flows move through a heat exchanger, allowing thermal recovery of heat due to differential temperatures between the two air flows. The system operates in a passive mode to exhaust stale air and induct fresh air while the fan of the heating/cooling unit is not operating, and accomplishes the same result in a mechanical mode when the fan operates.

7 Claims, 3 Drawing Sheets

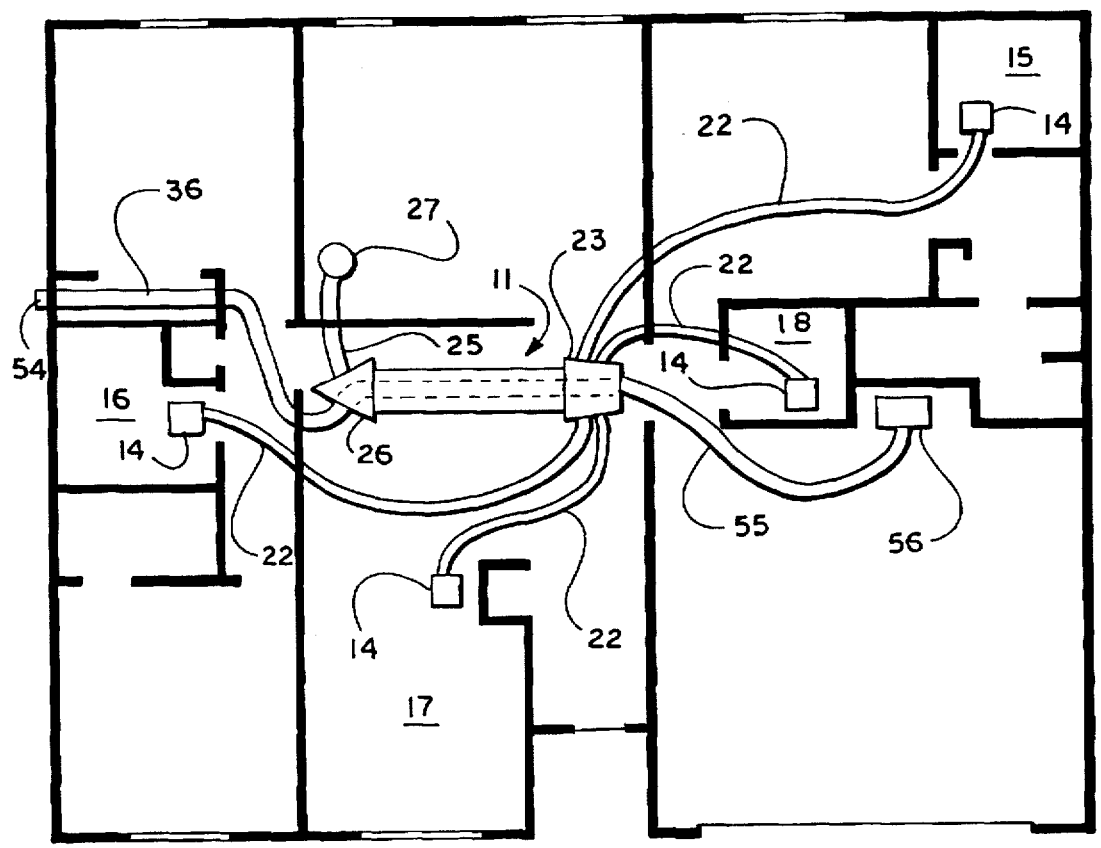
Fig_1
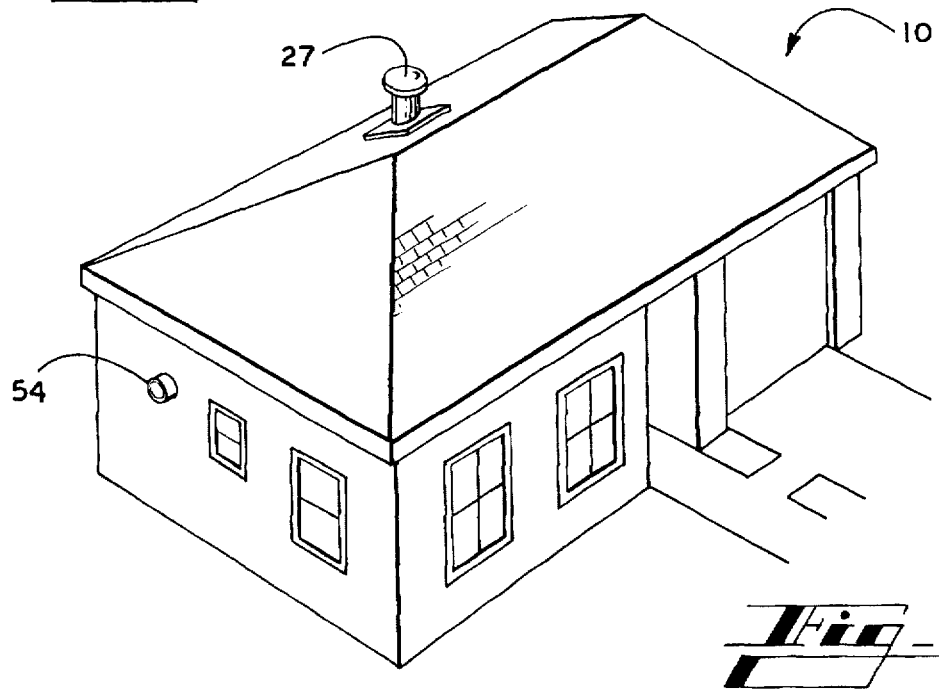
Fig_2

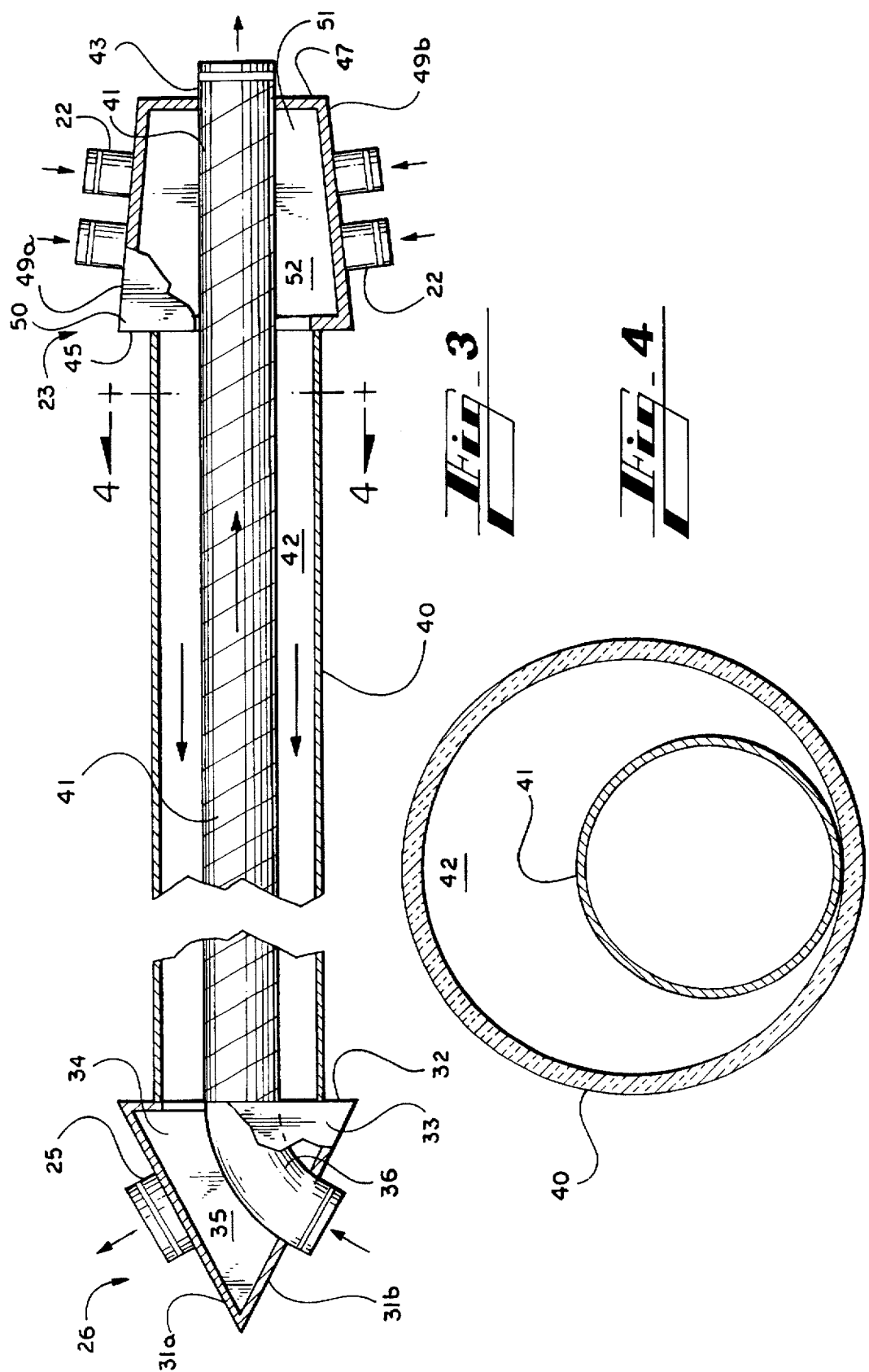

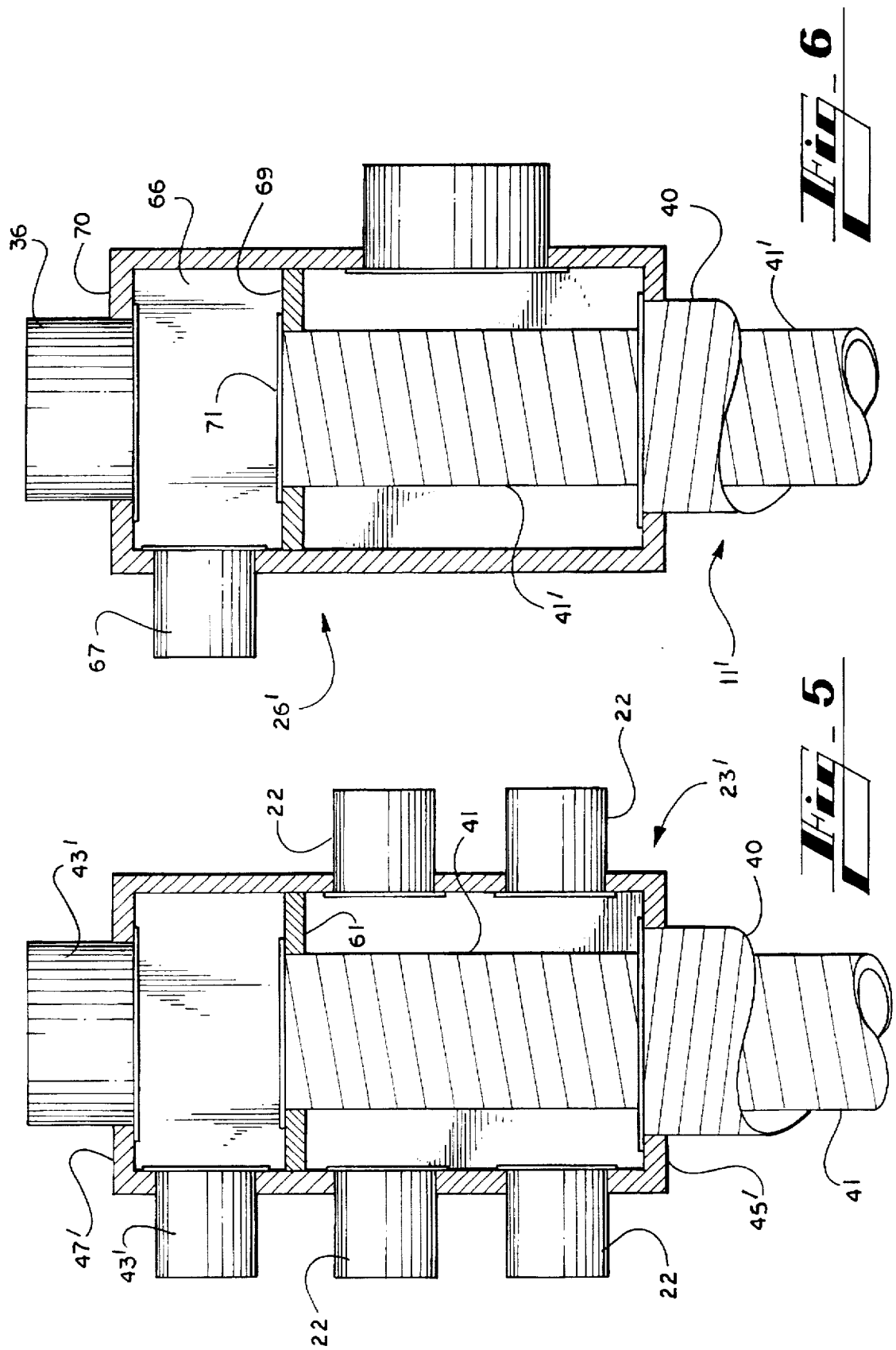

AIR EXCHANGE APPARATUS AND METHOD

FIELD OF THE INVENTION

This invention relates in general to heating and air conditioning enclosed spaces, and relates in particular to an apparatus and method for removing stale air from within an enclosed space and replacing that air with fresh air from outside the space.

BACKGROUND OF THE INVENTION

The concern for improved energy efficiency is leading to buildings that make more efficient use of energy for heating, ventilating, and air conditioning (HVAC) applications. These concerns usually are motivated by increasing energy costs and by a greater awareness of adverse environmental effects associated with energy consumption, particularly energy derived from the combustion of hydrocarbon fuel sources. Office and institutional buildings for many years have been designed with the goal of reducing heat loss during cold weather and heat gain during warm weather, and in recent years those same goals have become important to residential construction.

The energy efficiency of buildings in general, and especially of residential spaces, requires limiting the amount of unwanted heat transfer taking place between the interior space of the building and the ambient air outside the building. Unwanted heat transfer generally takes place by conduction through poorly-insulated walls or windows; and by air passing through cracks or other unwanted airways, for example, through poorly-fitting doors and windows resulting from poor construction methods or materials. Recent developments in residential construction, however, have produced buildings that are well-sealed against the environment and that are essentially air tight so long as windows and doors remain closed. This air-tight construction is especially prevalent in locations where extremes of temperature, either high or low, are expected throughout much of the year. In relatively hot climates such as the southwest regions of the United States, for example, most dwellings and other habitable structures are considered to require constant air conditioning throughout most of the year. Residences in northern climates likewise will require heating throughout all but a few summer months. In either case, the cost of heating and cooling such residences is significantly decreased by making the construction well-sealed against the environment.

The design and construction of well-sealed new residences has succeeded to the point that some homes now exhibit the "sick building" syndrome for many years associated with office and high-rise buildings. Any structure intended for human occupation must have the ability to exchange so-called "depleted air" or "stale air", rich in carbon dioxide, for fresh air containing the normal amount of oxygen. Moreover, the poor indoor-air quality that results from tight construction is compounded by the build-up of pollutants that accumulate within the structure. Most notably, new carpeting and cabinetry emanate formaldehyde, a gaseous compound evolved from phenolic resins in plastics and adhesives, while ground pressure in some location will force soil gases such as radon and septic gases out of the surrounding earth and into the interior space. To maintain a healthy indoor environment, a residence must be able to breath, exchanging fresh air for depleted air and allowing air to flow into and out of the structure in response to fluctuations in ambient air pressure brought about by changes in temperature and humidity.

The need to maintain a healthy interior environment within a tightly-constructed residence has been addressed in the art. The American Society of Heating, Refrigerating, and Air-Conditioning Engineers (ASHRAE) has promulgated Standard 62-1989, *Ventilation for Acceptable Indoor Air Quality*, that articulates current standards for minimum acceptable ventilation rates and indoor air quality for occupied structures. With respect to residential dwellings, that standard calls for fresh outdoor air to replace depleted indoor air at the rate of 0.35 per hour. This standard means that each hour a minimum of approximately one-third of the total indoor air in residential living spaces is to be removed and replenished with fresh air. For rooms such as kitchens and bathrooms, which will typically have a higher concentration of water vapor and greater buildup of hot air and stale air, the recommended refresh rate is even greater. ASHRAE Standard 62-1989 has been adopted as part of the building codes in many states and localities, and it is anticipated that the standard will eventually become part of the regulatory scheme of most jurisdictions. Although the foregoing ASHRAE standard sets the minimum level for air exchange, that standard does not mandate a means of compliance. At the simplest level, residents may achieve air exchange by leaving windows open or by utilizing fans for ventilation. Those efforts may not be feasible for practical reasons, and would likely be of dubious efficacy in meeting the required minimums. For example, opening the windows in rooms on an upwind side of a residence would probably create drafts in those rooms, leading to uneven cooling or heating within the residence.

SUMMARY OF THE INVENTION

Stated in general terms, the apparatus and method of the present invention uses principles of convection to exhaust stale air from an interior space, and to produce a replacement inflow of fresh air from outside the space. This withdrawal of stale air and replenishment by fresh air takes place either in a passive mode with no blowers or other forced-air movement, or in a mechanical mode in conjunction with an air moving mechanism such as the fan associated with the HVAC system of the residence or other space. When the fan of the home HVAC system is running in the mechanical mode, the intake of fresh air into the space is augmented by the blower and distributed throughout the rooms of the enclosed space.

Stated somewhat more particularly, stale air is exhausted from an enclosed space according to the present invention by recognizing that air at ceiling-level in the space is always warmer than the air below it. That condition exists whether the air is being heated or cooled and irrespective of the thermostat setting, assuming the absence of a ceiling fan operating fast enough to substantially mix the warmer and cooler air in the room. Because warm air always rises, the air pressure at ceiling level will increase to an extent imperceptible to occupants of the room. The present air exchange system utilizes these principles by providing outlet openings in the ceilings of selected rooms throughout the enclosed space. The higher-pressure warm air at the ceiling always flows toward lower-pressure air, and so the ceiling outlets become stale air outlets to exhaust the warmer air at the ceiling. Ducts connect the stale air outlets in the rooms to a vent accessible to the air outside the enclosed space. Individual ducts from the stale air outlets in the rooms preferably conduct the stale air to a plenum, and the plenum in turn is connected by another duct to the outside vent. To maintain the passive flow of stale air from the rooms to the outside, the outside vent preferably is elevated in relation to the stale air outlets so that the warm air leaving the rooms continues to rise until becoming vented to the lower-pressure outside air.

The present air exchange system further includes a fresh air inlet preferably located on an exterior wall or another part of the enclosed space, where the inlet is accessible to ambient air outside the enclosed space. A suitable duct or other air passage connects that fresh air inlet to return fresh air to the various rooms of the enclosed space. Because the residence or other enclosed space usually includes a central heating/air conditioning system such as a furnace including outlet ducts extending to air registers located throughout the enclosed space, the fresh air inlet of the present system advantageously is connected to supply fresh air to the return air side of the central heating/air conditioning furnace.

An exchange of air takes place in the passive mode when the fan of the furnace (or an alternative device for inducting fresh air into the enclosed space) is not operating. The warmer stale air in the rooms rises to the stale air outlets and exits the enclosed space through a vent located in the roof or elsewhere, and this physical movement of the higher-pressure air creates a lower-pressure condition within the enclosed space. When this inside air pressure falls below the pressure of the outside air, fresh air is drawn into the enclosed space through the only available opening, the fresh air inlet. That fresh air passively flows to the return air side of the furnace, and from there is drawn through the heating/air conditioning ducts to the individual rooms by way of the air registers in those rooms. Eventually, this inducted fresh air becomes stale, warms, and rises to the ceiling, so that the cycle described above constantly repeats itself.

The mechanical mode of the present invention takes place when the fan of the furnace or other air-handling equipment is running. In the mechanical mode of operation, the relative air pressures creating an intake of fresh air are reversed. Operating the furnace fan creates a lowered air pressure at its inlet side, and the only available portal by which fresh air may enter is through the fresh-air vent and duct work connecting that vent to the inlet side of the furnace. The furnace fan thus sucks fresh air into the system, where that fresh air becomes mixed with the normal return air drawn from the rooms by the furnace, heated or cooled, and then forcibly disbursed throughout the enclosed space. Once again, this fresh-air component eventually warms up, rises to ceiling level, and is exhausted out of the enclosed space as described above.

Whether air exchange according to the present invention occurs in the passive mode or the mechanical mode, there is some temperature differential between the outgoing stale air heating to the stale air outlet and the incoming fresh air. A preferred implementation of the present invention recoups at least a portion of the energy represented by that temperature differential. This recoupment takes place while the incoming fresh air flows through a duct concentric with a second duct through which flows the stale air withdrawn from the rooms through the stale air outlets. During heating season, some of the heat in the relatively-warm stale air becomes transferred to the incoming relatively-cold fresh air, thereby marginally heating that incoming air and correspondingly reducing the amount of energy otherwise required by the furnace to heat the fresh air to the temperature set at the thermostat. During cooling season, the stale air from the rooms (although the warmest air within the enclosed space) nevertheless usually is cooler than ambient air outside the enclosed space. The incoming fresh air thus loses some of its heat to the relatively-cooler stale air leaving the enclosed space, again marginally decreasing the energy otherwise required to cool the incoming fresh air to the thermostat setting.

BRIEF DESCRIPTION OF DRAWINGS

FIG. 1 is a plan view of a residence equipped with an air exchange apparatus according to a preferred embodiment of the present invention.

FIG. 2 is a pictorial view showing the exterior of a house equipped as in FIG. 1.

FIG. 3 is an enlarged plan view of the air exchange apparatus in the embodiment of FIG. 1. That apparatus is shown broken to shorten the drawing, and is cut away and sectioned to reveal details within the ducts and the end plenums of the air exchange device.

FIG. 4 is a section view taken along line 4—4 of FIG. 3.

FIG. 5 is a sectioned plan view of an interior end plenum according to a modification of the embodiment shown in FIG. 3.

FIG. 6 is a sectioned plan view of an exterior end plenum intended for use in cold-weather climates, according to another embodiment of the invention.

DETAILED DESCRIPTION OF PREFERRED EMBODIMENT

Turning first to FIG. 1, there is shown generally at 10 a floor plan of a typical residential structure equipped with an air exchange system according to a preferred embodiment of the invention. Although the structure 10 is described as a house in the present description, it should become apparent that description is illustrative only and is not limiting to the applications and purposes of the present invention. Moreover, it should also become apparent that air exchange systems according to the present invention are not limited to residential applications, but are potentially useful in connection with any enclosed space that is substantially airtight with respect to an outside source of fresh air.

The system installed in the structure 10, in general overview, includes a number of stale air outlets 14 located in the ceiling of selected rooms throughout the structure 10. The stale air outlets 14 in the preferred embodiment are located in rooms or other areas where substantial buildups of heat or humidity are expected, namely, the baths 15 and 16, the kitchen 17, and the washer/dryer room 18. Placing the stale air outlets in areas of maximum expected heat build up should maximize the removal of stale air with the present system, because the relative concentration of warm air in those areas will produce a greater differential air pressure between the ceiling and floor levels. However, it should be understood that other rooms or areas of the structure 10 also can be equipped with stale air outlets. In any case, those stale air outlets should be mounted in the ceiling or as close to ceiling elevation as is practicable within the structure 10, to obtain maximum advantage of the warm-air buildup at the ceiling.

Each stale air outlet 14 is connected by a separate duct 22 to an interior plenum 23 at one end of the air exchange device 11, allowing stale air from the rooms to enter the stale air outlets and flow along the ducts 22 to the interior plenum. A second stale-air duct 25 extends from an exterior plenum 26 to a vent 27 leading to the exterior of the structure 10. The vent 27 preferably is placed at an upper elevation on the roof of the structure, as illustrated in FIG. 2; in any case, the present system operates most efficiently with the stale-air outlet vent 27 elevated above the air exchange device 11, with that device in turn located in elevated relation to the stale-air outlets 14 in the rooms. For that reason, the air exchange device 11 in a typical residential application is located in the attic or other access space above the ceilings of the rooms, with the stale-air outlet duct 25 extending upwardly from the air exchange device to the vent 27.

The air exchange device 11 is shown with greater detail in FIGS. 3 and 4. The exterior plenum 26 is an enclosure of triangular section in plan view, having two sides 31a and 31b extending outwardly from a base 32 to join each other at an apex. The sides 31a, 31b and the base 32 support the mutually-spaced apart top panel 33 and bottom panel 34, to define an interior space 35 within the exterior plenum 26. The second stale air duct 25 is attached to an opening in the side 31 a of the exterior plenum and communicates with the interior space 35 of that plenum. A fresh-air inlet duct 36 extends through an opening in the other side 31b of the exterior plenum and passes through the interior space 35, remaining isolated from air communication with that interior space. The sides, base, and the top and bottom panels making up the exterior plenum 26 preferably are fabricated from an insulating material such as rigid Class I ductboard insulated and covered on the outside with an aluminized vapor jacket, although those skilled in the art will realize that other materials can be used for this plenum and for the other elements of the present system The exterior plenum 26 is connected to the interior plenum 23 by an elongated tubular construction including an outer tube 40 and a tube 41 of smaller diameter located within the outer tube. The outer tube 40 is made of a triple-laminated inner core of aluminum foil/polyester and metalized polyester film encapsulating a steel wire helix to maintain structural integrity to the outer tube, high-density fiberglass insulation, and an aluminized spiral vapor jacket as the outer surface of the tube. The smaller-diameter inner tube 41 is a double-laminated aluminum foil/polyester laminate and metalized polyester film, encapsulated in a steel wire helix. The outer tube 40 thus is substantially insulated so as to minimize heat transfer through the wall of the outer tube, but the inner tube 41 is substantially uninsulated so as to promote heat transfer between the inside and outside of that inner tube. In a preferred embodiment used for residential applications, the length of the outer tube 40 and the inner tube 41, between the two end plenums, is 12 feet. The ends of the outer tube 40 join openings (not shown) in the respective bases 32 and 45 of the two plenums 23 and 26, so that the interior space 42 within the outer tube communicates with the interior spaces 35 and 52 of the plenums. The diameter of the inner and outer tubes is important to the proper operation of an air exchange system according to the present invention, and the determination of each diameter is discussed below in greater detail.

FIG. 4 shows that the inner tube 41, while located within the outer tube 40, is not necessarily concentric with the outer tube. Instead, the inner tube 41 rests on the bottom of the interior wall of the outer tube 40. The interior space 42, within the outer tube 40 but not occupied by the inner tube 41, defines a volume through which stale air travels between the interior spaces of the interior plenum 23 and the exterior plenum 26, as is explained below in greater detail. The outer tube 40 attaches to the base 32 of the exterior plenum 26, communicating the interior space 42 of the outer tube with the interior space 35 of that plenum.

The interior plenum 23 is an enclosure of trapezoidal shape in plan view, as seen in FIG. 3. The larger base 45 of that plenum is parallel to the base 32 of the exterior plenum, and likewise joins the outer tube 40 so that the interior space 42 of the outer tube communicates with the interior space 52 within the interior plenum. The smaller base 47 of the trapezoidal-shaped interior plenum 23 is parallel to the larger base 45 and is spaced a distance apart from that larger base; the inner tube 41 extends through an opening in the smaller base 47 after passing through the interior space 52, out of air communication with that interior space.

The interior plenum 23 has a pair of sides 49a and 49b, in which are formed a number of inlet ports for receiving the several ducts 22 extending from the stale air outlets in the rooms of the structure 10. A top panel 50 and a bottom panel 51 join and are sealed to the sides and the larger and smaller bases of the interior plenum, defining the interior space 52 within the interior plenum and completing that plenum. The interior plenum 23, as with the exterior plenum 26 in the preferred embodiment, is made of rigid Class I ductboard, insulated and covered on the outside with an aluminized vapor jacket, cut to shape and sealed to prevent air leakage into or out of the interior space 52.

The inner tube 41 within the air exchange device 11 supplies fresh air to the present air exchange apparatus. As shown in FIG. 3, the inner tube 41 extends into and through the exterior plenum 26, passing through an opening in the side 31b of that plenum and connecting to one end of the fresh-air inlet duct 36. The fresh-air inlet duct 36 extends through the structure 10, as seen in FIG. 1, to another end joining the inlet air vent 54 for admitting fresh air from outside the structure. FIG. 1 shows that a preferred location for the inlet air vent 54 is an exterior side wall of a dwelling, for the present air exchange system incorporated into a residential structure.

The inner tube 41 of the air exchange device also extends to the interior plenum 23 and exits the smaller base 47 of that plenum as the fresh-air outlet 43 from the plenum. The fresh-air outlet 43 connects to the inlet air supply duct 55, FIG. 1, leading to the return air side of the furnace/air conditioning unit 56 associated with the structure 10. The inlet air supply duct 55 preferably supplies air to the unit 56 upstream of the air filter commonly associated with such units, so that fresh air supplied through the duct 55 mixes with the return air drawn into the unit from the interior of the structure 10. The furnace/air conditioning unit 56 may be a typical such unit known to those skilled in the art, apart from the connection of the air supply duct 55 to the return air side of that unit.

Although the interior plenum 23 and the exterior plenum 26 are respectively shown as trapezoidal- and triangular-shaped solids, the shapes of those end plenums are not critical to the operation of the present air exchange system. The shapes of those plenums are determined by factors such as the number of ports required to accommodate the ducts 22 extending from the stale air inlets 14, in the case of the interior plenum 23, and by the physical space available within the structure 10 to accommodate the air exchange device 11. For example, FIG. 5 shows a modified interior plenum 23' designed for use in large residences or other structures having multiple heating/cooling systems. The modified interior plenum 23' permits connecting such multiple heating/cooling systems to a single air exchange device according to the present invention and using the modified plenum in place of the plenum 23 described above.

The modified interior plenum 23' includes a first base 45' for connection to the outer duct 40 and a second base 47' parallel to and spaced apart from the larger base, with one end of the inner tube 41 extending through the larger base and into the interior of the modified plenum. A number of ducts 22 allow connecting the modified interior plenum 23' to stale air outlets, as described above. However, the modified interior plenum 23' also includes two fresh-air outlets 43' intended for connection to inlet air supply ducts 55 (not shown in FIG. 5) leading to a corresponding number of separate heating/cooling units. A suitable partition 61, located within the modified interior plenum 23', has an opening receiving an end of the inner tube 41 and defining a chamber communicating with the fresh-air outlets 43' within that modified interior plenum. Although the modified interior plenum 23' in FIG. 5 is disclosed as having two separate fresh-air outlets 43', it should be understood that the number of separate heating/cooling systems within the residence or other structure determines the number of separate fresh-air outlets required.

The respective diameters of the inner tube 41 conducting fresh air into the system, and of the outer tube 40 conducting stale air out of the system, are important to the proper operation of the air exchange system. Furthermore, proper calculation of the respective diameters for those tubes will vary according to several factors, including the weather factor (including average annual wind velocity and currents) for the geographic location of the installation, the overall size of the structure 10, the ceiling height of the structure, and the volume of air desired to be interchanged with the present system. Installations of the present air exchange apparatus thus are custom-tailored to particular structures and variables, including whether the structure is in a predominately hot-weather climate requiring air-conditioning, or in a predominately cold-weather climate requiring heating, for most of each year. An air exchange apparatus according to the preferred embodiment is determined for a hot-weather (air conditioning) climate, according to the following calculations.

To determine the appropriate sizes of the inner tube 41 for fresh air into a system at a particular geographical location and the outer tube 40 for conducting stale air out of the system according to the present invention, it is necessary to measure the average air exchange per hour at 50 Pascals (ACH 50) for new construction in the geographical location. (A Pascal is a unit of pressure equal to one newton per square meter, and the 50-Pascal standard is a typical code requirement.) The techniques of blower-door testing to measure the average ACH 50 for a particular location are known to those skilled in the art.

It then is necessary to determine the appropriate weather data, the so-called "W Factor", for the geographical location of the installation. The W Factor is obtainable from the ASHRAE publication "Indoor Air Quality", Vol. 7, No. 4.

Calculate the average annual air exchange rate, $A_E$ for the particular location as follows:

$$A_E = ACH\ 50 \times W. \quad (1)$$

where the value of ACH 50 is determined for the locality by blower door testing.

Next, calculate the cubic footage of the structure, according to the formula:

$$SF \times CH,$$

where:

SF=square footage of the structure; and

CH=ceiling height of the structure.

The diameter of the inner tube 41 for fresh air intake is sized according to the mechanical mode of operation, discussed in greater detail below, based on the volume of air flow given by the following equation:

$$(CF \times ACH) \div 60 = CFM\ @\ R/A\ SP, \quad (3)$$

where

CFM=cubic feet per minute, and

R/A SP=return air static pressure (accepted standards in the HVAC industry for residential construction range from 0.8–0.15; a value of 0.1 is used in the present preferred embodiment).

The diameter of the outer tube 40 for stale air outlet is sized in the passive mode based on the volume of air flow given by the following equation:

$$\text{at passive SP and FAI, } [(ACH \div W) - A_E] \times (CF \div 60) = CFM \quad (4)$$

where:

passive SP equals passive static air pressure; a value of 0.04 is used in calculations for the present preferred embodiment.

In equations (3) and (4), the air exchange rate (ACH) is a constant fixed by ASHRAE-62 and is not to be confused with the measured location-specific variable ACH 50 in equation (1). At the present, ASHRAE-62 requires the air exchange rate ACH to be a constant 0.35.

The following is an example of the calculations described above, sizing an air exchange device 11 for installation in a home of 2,000 square feet having 10-foot ceilings and located at Tucson, Ariz., based on the following factors:

ACH (a constant)=0.35

ACH 50 (measured for Tucson)=0.18

W Factor=0.79

R/A SP=0.1

Passive SP=0.04

Cubic footage (CF)=20,000

Using equation (1):

$$A_E = 0.18 \times 0.79 = 0.14$$

Using the formula (3) above, the flow rate of air in the inner tube 41 for fresh-air inlet is:

$$(20,000 \times 0.35) \div 60 = 116.67\ CFM\ @\ R/A\ SP\ of\ 0.1.$$

Referring to the appropriate ASHRAE chart, this air flow requires a duct having a circular cross-sectional area of 28.27 sq. in. for inducting fresh air in the mechanical mode. The round inner tube 41 thus should have a diameter of 6 inches.

The flow rate of air in the outer tube 40 for removing stale air is calculated by using the formula (4) as follows:

$$[(0.35 \div 0.79) - 0.14] \times (20,000 \div 60) = 100\ CFM.$$

Referring again to the appropriate ASHRAE chart, this flow rate requires a duct cross-sectional area of 38.48 sq. in. for exhausting stale air in the passive mode. That area must be added to the area of the inner tube 41, which occupies part of the area of the outer tube 40, so that the outer tube requires a cross-section area of 66.75 sq. in. The diameter of the outer tube 40 thus is 10 inches.

The present exchange system operates in the passive mode whenever the fan associated with the furnace/air conditioning unit 56 is not operating. In that mode, the relatively warm stale air rises in the rooms of the structure 10, increasing the air pressure at ceiling level. This increase in air pressure, relative to the pressure of air outside the structure, induces a flow of the higher-pressure stale air into the stale air outlets 14, and that air flows through the ducts 22 to enter the interior plenum 23 at one end of the air exchange device 11. That flow of stale air then enters the interior space 42, between the inner tube 41 and the outer tube 40, leading to the interior space 35 in the exterior plenum 26 at the other end of the air exchange device 11. From that plenum, the stale air enters the air duct 25 and rises to exit the structure 10 through the stale air vent 27 through the roof.

As stale air is exhausted in the passive mode of operation, fresh air is drawn into the relatively air-tight structure 10 through the inlet air vent 54 and the duct 36 leading to the inner tube 41 of the air exchange device 11. This incoming flow of fresh air passes through the air exchange device 11 without mixing with the stale air flowing in the opposite direction through that device. The incoming fresh air in the tube 41 passes through the interior plenum 23 and flows through the inlet air supply duct 55 to enter the return air side of the furnace/air conditioning unit 56. From that unit, the inflowing fresh air is distributed to the various rooms of the structure 10, through the conventional duct work associated with the HVAC system of the structure.

Operation in the passive mode depends on outdoor weather conditions in relation to indoor conditions. These variable conditions include indoor and outdoor air temperature, atmospheric pressure, and relative humidity. Understanding that air moves from regions of high pressure to regions of relatively low pressure, it will be understood that the volume of fresh air entering the inlet air vent 54 can vary from time to time. On an annualized basis, an air exchange system constructed according to the present invention should provide the required exchange of fresh air for stale air in a relatively unobtrusive manner, without creating drafts within the structure.

The mechanical mode of operation takes place when the fan of the furnace/air conditioning unit 56 is operating. Operation of that fan creates a relatively low air pressure in the return air side of the unit 56, and that low pressure is communicated to the inlet air supply duct 55. That low pressure draws fresh air from outside into the system, through the inlet air vent 54 and the air exchange device 11. That incoming fresh air (together with existing air entering the return air side of the furnace/air conditioning unit 56) is heated or cooled and then forceably disbursed throughout the structure 10. Mechanical operation of the system may also cause an increase in air pressure at one or more of the stale air outlets 14 in the ceilings, inducing a further flow of air through the stale air outlets to exit the structure. After the blower of the furnace/air conditioning unit 56 turns off, the fresh air drawn into the structure eventually becomes stale, warms, and rises to the ceiling, and the passive cycle described above repeats itself.

Whether in the passive mode or mechanical mode of operation, there is some degree of temperature differential between the outgoing stale air and the incoming fresh air flowing through the air exchange device 11. Whatever that temperature difference, some energy transfer will take place across the surface of the inner tube 41 comprising the air exchange device, along its length between the plenums 23 and 26. Where the outgoing stale air is warmer than the incoming fresh air during heating season, the fresh air will absorb some of that energy while traversing the air exchange device. Likewise, where the outgoing stale air is cooler than the incoming fresh air, during air cooling season, the fresh air will give up some of that energy to the stale air while flowing through the air exchange device. In either case, less energy is required from the furnace/air conditioning unit 56 to heat or cool the incoming fresh air to the desired temperatures set at the thermostat controlling that unit. During the mechanical mode of operation, it should be expected that the sensible energy recovery within the air exchange device 11 is greater than in the passive mode.

The embodiment of the present invention described to date is intended for installation in geographic locations having a generally dry and warm climate. Those climates generally are characterized by air conditioning, i.e., cooling, throughout at least several months of each year to maintain interior temperatures at a comfortable level, and by few if any days where the exterior temperature falls below 32° F. However, an air exchange system according to the present invention is adaptable to environments of cold weather or high humidity. In a preferred embodiment of the present invention, this adaptation mixes the incoming fresh air with warm air supplied from within the structure, before the fresh air passes into the inner tube 41 of the air exchange device. The temperature of cold air entering the device through the fresh air intake is raised above 32° F., inhibiting the formation of moisture due to condensation within the air exchange device.

FIG. 6 shows a modified air exchange device 11' intended for use in environments of cold weather or high humidity. That air exchange device 11' includes an inner tube 41' within an outer tube 40, both tubes extending between a modified exterior plenum 26' and an interior plenum (not shown) which can be identical to the interior plenums 23 or 23' previously discussed. The modifications adapting the air exchange device 11' to cold-weather use include an antechamber 66 within the exterior plenum 26' and an additional inlet port 67 for the induction of heated air into the antechamber. The diameter of the inner tube 41' is increased, relative to the diameter of the inner tube 41 in the preceding embodiment designed for the same structure and other parameters in a warm climate, to accommodate the resulting increased volume of mixed air moving through the inner tube and into the air exchange system. The volume of stale air being exhausted through the air exchange device 11' is not changed in the cold-weather embodiment disclosed herein.

The modified exterior plenum 26' is a box generally rectangular in overall shape as shown in FIG. 6, unlike the triangle-shaped exterior plenum shown in FIG. 3. The antechamber 66 of the modified exterior plenum 26' is formed in part by a partition 69 located a distance inwardly from the outer end 70 of the plenum and extending between the opposed side walls of that plenum. The fresh air inlet duct 36 joins the outer end 70 and communicates with the antechamber 66. The inlet port 67 communicates with the antechamber 66 through one side wall of the exterior plenum 26'. The inlet port 67 is connected by suitable ducting (not shown) to receive heated air from the furnace or other heating system installed within the structure containing the modified air exchange device 11'. The diameter of the inlet port 67 and its connecting duct depends on the volume of supply air needed to temper the temperature of the incoming outside air, and that diameter is based on the static pressure of supply air available from the installed heating system. That volume of supply air is determined as discussed below.

Turning again to FIG. 6, it is seen that the outer end 71 of the inner tube 41' connects to the partition 69 at an opening formed therein for that purpose. The inner tube 41 thus receives the flow of fresh air incoming through the inlet duct 36, tempered by the flow of heated supply air entering the antechamber 66 through the port 67.

As mentioned above, the diameter of the inner tube 41' is determined in a manner different from that of the inner tube in the first embodiment, to accommodate the increased volume of mixed fresh air and heated supply air entering the system through the air exchange device 11'. (The volume of stale air exhausted by the disclosed cold-weather system is not changed from that over the warm-climate system previously described. The technique for determining the airflow volume through the outer tube 40 thus is unchanged, although the diameter of that outer tube in an actual cold-climate installation may change to maintain the net cross-section flow area between the outer tube 40 and an enlarged inner tube 41'.)

To determine the diameter of the inner tube 41', it is necessary to calculate the mixed air flow rate (Am) in that tube. For that calculation, one first determines the flow rate (Av) of outside air, obtained from the equation (1) and using an ACH value of 0.35:

$$(20,000 \times 0.35) \div 60 = 116 \text{ CFM}. \tag{5}$$

That volume of outside air is mixed in the antechamber 66 with supply air (Ts) from the heating system associated with the structure. In order that condensation not form in the interior spaces of the air exchange device 11', the blended air moving through that device must be at least 32° F., that is, at or above the dew point. The temperature differential (Tsd) between the supply air (S/A) and mixed air (A/m) is determined as follows:

$$\text{Tsd} = (\text{Ts} - (\text{Tin} - \text{Tv})), \tag{6}$$

where:

Tv is design outdoor temperature, which varies per the published ASHRAE standard for the locale and for this example is assumed to be 0° F., Tm, the desired temperature of mixed air, is assumed to be a constant at 32° F., and Ts, the supply-air temperature, is assumed to be 120° F.

Using formula (6), the temperature differential Tsd becomes:

$$\text{Tsd} = (120 -) \ 32 - 0)) = 88° \text{ F}. \tag{}$$

To achieve the desired temperature of mixed air, the volume of supply air S/A is determined by the following ratio:

$$\text{Tm} \div \text{Tsd} = (32 \div 88) = 0.36, \text{ or } 36\%. \tag{7}$$

The volume As of supply air required to achieve blended air of that temperature is:

$$\text{As} = \text{Av} \times \text{S/A} = 116 \times 0.36 = 42 \text{ CFM}. \tag{8}$$

The flow rate of the mixed air thus is:

$$\text{Am} = \text{Av} + \text{As} = 116 + 42 = 156 \text{ CFM}. \tag{9}$$

Referring again to the appropriate ASHRAE chart for R/A SP=0.1, the inner tube 41' requires a cross-section area of 38.48 sq. in., provided by a diameter of 7 in.

Although the technique for calculating the net area of the outer tube 40 remains unchanged as mentioned above, the actual diameter of that outer tube must be increased to provide the same net area between that tube and the inner tube 41' of increased size. Determining that enlarged diameter of the outer tube to maintain the cross-sectional area required for stale air flow is well within the skill of the art.

An air exchange system as disclosed herein may most easily be incorporated into new construction. However, an air exchange system according to the present invention can also be retrofitted into an existing residence or other structure. Both the ACH 50 and the R/A SP would have to be measured and ascertained for the specific structure, and with that data an ASHRAE-62 compliant air exchange system could then be designed as above. The cost of installing that system would vary from structure to structure, and might exceed the cost of building the equivalent system into a new structure, but there is no theoretical impediment to incorporating the present system into the existing home market.

It should also be understood that the foregoing relates only to a preferred embodiment of the present invention, and that numerous modifications and changes thereto may be made without departing from the spirit and scope of the invention as set forth in the following claims.

I claim:

1. An air exchange system for an enclosed structure having plural rooms and being sufficiently airtight so as to admit less than a minimum acceptable volume of fresh air by infiltration from outside the structure, the system comprising:

air outlets at an elevated location in at least some of the rooms for eduction of relatively warm stale air from those rooms;

first and second plenums mounted in elevated relation to the air outlets and separated by an outer duct and an inner duct of smaller diameter contained within the outer duct, the space between the outer and inner ducts defining an air flow path between the two ducts;

means communicating between the first plenum and the air outlets so as to conduct the stale air from the rooms to the first plenum;

the first plenum having an opening connecting with one end of the outer duct to admit the stale air into the outer duct, and the inner duct extending through that one end and through the opening to exit the first plenum;

the second plenum having an opening connecting with the other end of the outer duct, and the inner duct extending through that opening to exit the second plenum;

a duct connecting the second plenum to a stale air outlet at a location outside the building so as to establish a flow path for stale air through the first plenum, the air flow path between the outer and inner ducts, and the second plenum, whereby the relatively warm stale air in the rooms rises and enters the air outlets to flow through the plenums and exhausts through the stale air outlet connected to the second plenum, thereby reducing the air pressure within the rooms;

a duct in air flow communication between the exit of the inner duct from the first plenum and at least show some of the rooms; and a duct in air flow communication between the exit of the inner duct from the second plenum and a source of fresh air outside the structure, whereby the reduced air pressure within the rooms is operative to induct fresh air into the structure through the second plenum, the inner duct, the first plenum, and the duct in flow communication with at least some of the rooms.

2. The system as in claim 1, wherein:

the inner duct has a diameter sized to mechanically induct the minimum acceptable volume of fresh air for that building; and the outer duct has a diameter sized so that the air flow path between the outer and inner ducts is operative to passively exhaust a volume of stale air from the building corresponding to at least the minimum acceptable volume of fresh air for that building.

3. The system as in claim 1, wherein:

the outer duct is insulated to minimize heat transfer across that duct; and the inner duct is relatively uninsulated so as to permit heat transfer between air flowing through that duct and air flowing in the air flow path between the inner and outer ducts, thereby recuperating between said ducts a portion of the heat represented by a temperature differential between said air flows.

4. An air exchange system for an enclosed structure having plural rooms and being sufficiently airtight so as to admit less than a minimum acceptable volume of fresh air by infiltration from outside the structure, the system comprising:

air outlets at an elevated location in at least some of the rooms for education of relatively warm stale air from those rooms;

a first plenum mounted in elevated relation to the air outlets;

means communicating between the first plenum and the air outlets so as to conduct the stale air from the rooms to the first plenum;

an outer duct connecting the first plenum to a stale air outlet at a location outside the building so as to establish a flow path for stale air through the air outlets, the first plenum, the communicating means, and the stale air outlet, whereby the relatively warm stale air in the rooms rises and enters the air outlets to flow through the first plenum and is exhausted through the stale air outlet, thereby reducing the air pressure within the rooms;

an inner duct of smaller diameter contained within the outer duct, the space between the outer and inner ducts defining an air flow path between the two ducts;

a second plenum having an opening connecting with the other end of the outer duct, and the inner duct extending through that opening to exit the second plenum;

a duct in air flow communication between the exit of the inner duct from the second plenum and a source of fresh air outside the structure; and means in air flow communication through the second plenum and fresh air outlets located in at least some of the rooms at elevations lower than the elevated locations of the stale-air outlets;

whereby the reduced air pressure within the rooms inducts fresh air into the structure through the second plenum, the inner duct, the first plenum, and the fresh air outlets in the rooms.

5. A process for exchanging air in an enclosed structure having plural rooms and being sufficiently airtight so as to admit less than a minimum acceptable volume of fresh air by infiltration from outside the structure, the process comprising the steps of:

removing relatively warm stale air from outlets at an elevated location an in at least some of the rooms;

conducting the removed stale air through separate ducts to a first plenum in elevated relation to the room outlets;

establishing an air flow path from the first plenum to a stale air outlet in elevated relation to the first plenum, whereby the relatively warm stale air in the rooms is exhausted through the stale air outlet, thereby reducing the air pressure within the rooms; and establishing a flow path from a source of fresh air outside the structure, to fresh air outlets located in at least some of the rooms at elevations lower than the outlets for stale air, whereby the reduced air pressure within the rooms inducts fresh air into the structure through the flow path from the source of fresh air outside the structure.

6. The process as in claim 5, comprising the further step of:

exchanging heat between the stale air removed from the rooms and the fresh air inducted into the structure, so as to recoup at least part of the energy represented by a temperature differential between the stale air and the fresh air.

7. The process as in claim 6, wherein the step of exchanging heat comprises the steps of:

establishing said air flow path from the first plenum though a first duct leading to a second plenum;

establishing an air flow path for the inducted fresh air through a second duct concentric to the first duct; and providing a good heat transfer separation between the first and second ducts.

* * * * *